(12) United States Patent
Onuki et al.

(10) Patent No.: US 12,179,759 B2
(45) Date of Patent: Dec. 31, 2024

(54) VEHICLE CONTROL DEVICE

(71) Applicant: TOYOTA JIDOSHA KABUSHIKI KAISHA, Toyota (JP)

(72) Inventors: Yusuke Onuki, Toyota (JP); Yuki Kawasaki, Mishima (JP); Shun Sato, Toyota (JP); Hidetoshi Hinuma, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/420,406

(22) Filed: Jan. 23, 2024

(65) Prior Publication Data

US 2024/0326798 A1 Oct. 3, 2024

(30) Foreign Application Priority Data

Feb. 3, 2023 (JP) ................................. 2023-015147

(51) Int. Cl.
*B60W 30/14* (2006.01)

(52) U.S. Cl.
CPC ....... *B60W 30/143* (2013.01); *B60W 2520/10* (2013.01); *B60W 2520/105* (2013.01); *B60W 2554/802* (2020.02); *B60W 2710/1005* (2013.01)

(58) Field of Classification Search
CPC ......... B60W 30/143; B60W 2554/802; B60W 2520/10; B60W 2520/105; B60W 2710/1005
USPC .......................................................... 701/53
See application file for complete search history.

(56) References Cited

U.S. PATENT DOCUMENTS

| 4,261,431 | A | * | 4/1981 | Hawbaker ............ B62D 11/183 60/427 |
| 5,765,117 | A | * | 6/1998 | Horiguchi ............... F16H 61/21 477/121 |
| 8,355,851 | B2 | | 1/2013 | Inoue et al. |
| 8,370,040 | B2 | | 2/2013 | Inoue et al. |
| 8,417,430 | B2 | | 4/2013 | Saeki |
| 8,548,709 | B2 | | 10/2013 | Morita |
| 8,768,597 | B2 | | 7/2014 | Kagawa |
| 9,174,643 | B2 | | 11/2015 | Aso |
| 10,017,178 | B2 | | 7/2018 | Morimoto et al. |

(Continued)

FOREIGN PATENT DOCUMENTS

| JP | 2003-343305 A | 12/2003 |
| JP | 6413964 B2 | 10/2018 |
| JP | 6989704 B2 | 1/2022 |

*Primary Examiner* — Colby M Hansen
(74) *Attorney, Agent, or Firm* — Sughrue Mion, PLLC

(57) ABSTRACT

To effectively improve drivability during travel control, provided is a vehicle control device comprising a travel control unit configured to set a target acceleration of the vehicle based on a target vehicle speed and an actual vehicle speed, and execute a travel control for automatically controlling travel of the vehicle by operating the drive device based on the target acceleration; a shift control unit configured to set a target driving force, and execute a shift control for operating the transmission device based on the target driving force; and a downshift suppression control unit configured to acquire an actual acceleration during execution of the travel control and suppress execution of downshift of the transmission device by the shift control unit based on an acceleration threshold value.

8 Claims, 6 Drawing Sheets

(56) References Cited

U.S. PATENT DOCUMENTS

| | | | |
|---|---|---|---|
| 10,118,617 B2 | 11/2018 | Urano et al. | |
| 10,486,698 B2 | 11/2019 | Masui et al. | |
| 2007/0010927 A1* | 1/2007 | Rowley | B60W 30/18036 |
| | | | 701/54 |
| 2011/0307152 A1* | 12/2011 | Shono | B60W 10/184 |
| | | | 701/54 |
| 2016/0033033 A1* | 2/2016 | Komatsu | B60K 35/29 |
| | | | 74/473.19 |
| 2017/0015321 A1 | 1/2017 | Nakadori | |
| 2019/0129424 A1* | 5/2019 | Kishi | B60W 60/001 |
| 2019/0129439 A1* | 5/2019 | Kishi | G05D 1/0223 |
| 2019/0295419 A1 | 9/2019 | Tosa et al. | |
| 2020/0031345 A1* | 1/2020 | Yamada | B60W 30/143 |
| 2021/0221379 A1 | 7/2021 | Sato et al. | |
| 2024/0171874 A1* | 5/2024 | Hayashi | H04N 25/771 |

* cited by examiner

VEHICLE CONTROL DEVICE

CROSS-REFERENCE TO RELATED APPLICATION

This application claims priority to Japanese Patent Application No. JP2023-015147 filed on Feb. 3, 2023, the content of which is hereby incorporated by reference in its entirety into this application.

BACKGROUND OF THE INVENTION

1. Field of the Invention

The present disclosure relates to a vehicle control device.

2. Description of the Related Art

For example, Japanese Patent Publication No. 6989704 discloses a device that limits the acceleration of the own vehicle by inhibiting downshifting of the transmission when a predetermined condition is satisfied that a following vehicle traveling in an adjacent lane attempts to overtake the own vehicle while Adaptive Cruise Control (ACC) is being executed.

There is a scene in which the actual acceleration of the vehicle is insufficient for the driver's aim during manual driving in which the driver drives the vehicle while operating the accelerator pedal. Even in such a scene, if the shortage of the actual acceleration is within the allowable range of the driver, the driver may keep the amount of depression of the accelerator pedal and wait for the increase of the actual acceleration to cause the vehicle to travel so that the transmission does not automatically shift down (kick-down).

On the hand, in cruise control such as ACC (hereinafter, also simply referred to as travel control), the operation of the drive device is feedback-controlled, for example, on the basis of a deviation between the target vehicle speed and the actual vehicle speed. Therefore, in a scene in which the actual vehicle speed is insufficient with respect to the target vehicle speed during the execution of the cruise control, even if the actual acceleration is within the allowable range of the driver, the output of the driving device is increased so that the actual vehicle speed approaches the target vehicle speed, and as a result, the transmission is shifted down. Such a scene is likely to occur in a case where the vehicle travels on an uphill road having a relatively large slope, in a case where the vehicle accelerates again after the end of the speed management control for decelerating on the curved road, in a case where the preceding vehicle accelerates while following the preceding vehicle at a vehicle speed slower than the target vehicle speed, or the like.

When the transmission is downshifted due to acceleration felt unnecessary by the driver during cruise control, a shift shock occurs in the case of the stepped transmission, and a sudden increase in the rotational speed of the drive device occurs in the case of the continuously variable transmission, which leads to a problem of deterioration in drivability. In the device described in Japanese Patent Publication No. 6989704, the acceleration limit of ACC is applied to a scene in which the following vehicle is going to overtake own vehicle, and the application to a scene in which the actual vehicle speed is insufficient with respect to the target vehicle speed as the vehicle travels on an uphill road or the like is not assumed.

SUMMARY OF THE INVENTION

The present disclosure has been made in order to solve the above described problems, and an object thereof is to effectively improve drivability during travel control.

According to the present disclosure, there is provided a vehicle control device which is applied to a vehicle having a transmission device in a power transmission path for transmitting power from a drive device to a drive wheel. The vehicle control device comprising a travel control unit configured to set a target acceleration of the vehicle based on either a predetermined target vehicle speed and an actual vehicle speed, or a predetermined target inter-vehicle distance and an actual inter-vehicle distance, and execute a travel control for automatically controlling travel of the vehicle by operating the drive device based on the target acceleration; a shift control unit configured to set a target driving force of the vehicle based on at least an actual vehicle speed, and execute a shift control for operating the transmission device based on the target driving force; and a downshift suppression control unit configured to acquire an actual acceleration during execution of the travel control by the travel control unit and suppress execution of downshift of the transmission device by the shift control unit based on a predetermined acceleration threshold value different from the target acceleration and the actual acceleration.

DESCRIPTION OF THE EMBODIMENTS

Description is now given of a vehicle control device according to at least one embodiment of the present disclosure with reference to the drawings.

[Hardware Configuration]

Figure 1:
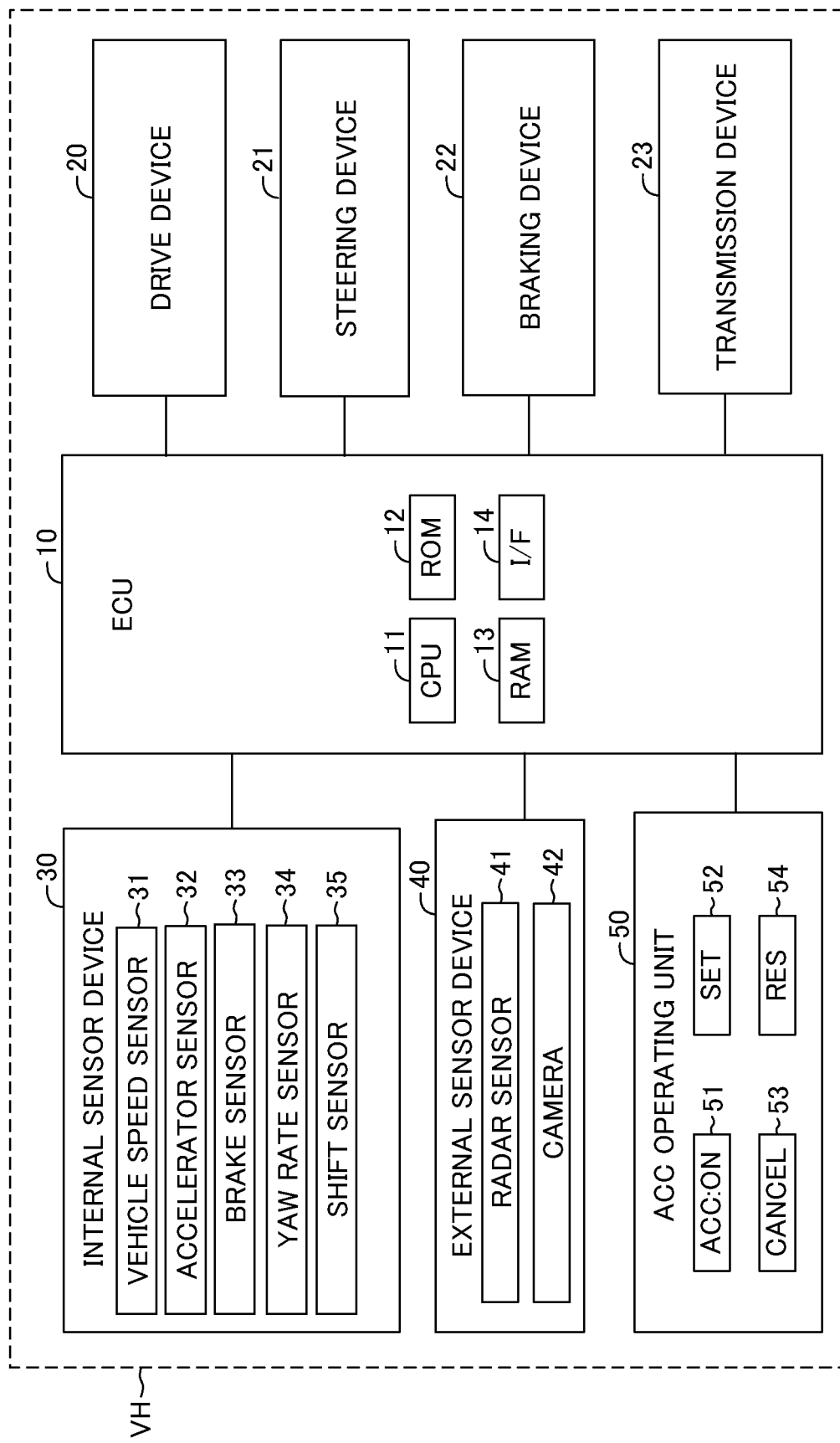
FIG. 1 is a schematic diagram showing a hardware configuration of a vehicle according to the present embodiment.

FIG. 1 is a schematic diagram of a hardware configuration of a vehicle VH according to the present embodiment. Hereinafter, the vehicle VH may be referred to as an own vehicle when it is required to distinguish it from other vehicles.

The vehicle VH has an ECU (Electronic Control Unit) 10. The ECU 10 includes a CPU (Central Processing Unit) 11, ROM (Read Only Memory) 12, RAM (Random Access Memory) 13, an interface device 14, and the like. The CPU 11 executes various programs stored in the ROM 12. The ROM 12 is a non-volatile memory that stores data and the like required for the CPU 11 to execute various programs. The RAM 13 is a volatile memory to provide a working region that is deployed when various programs are executed by the CPU 11. The interface device 14 is a communication device for communicating with an external device.

The ECU 10 is a central device which executes various kinds of control such as ACC and shift control. A drive device 20, a steering device 21, a braking device 22, a transmission device 23, an internal sensor device 30, an external sensor device 40, and an ACC operating unit 50, and the like are communicably connected to the ECU 10.

The drive device 20 generates a driving force to be transmitted to driving wheels of the vehicle VH. As the drive device 20, for example, an engine and a motor are given. The vehicle VH may be any of an engine-powered vehicle, a hybrid-powered vehicle (HEV), a plug-in Hybrid vehicle (PHEV), a fuel-cell vehicle (FCEV), and an electric vehicle (BEV) as long as the vehicle includes the transmission device 23 in a power transmission path between the drive device 20 and drive wheels (not shown). The steering device 21 applies steering forces to steerable wheels of the vehicle VH. The braking device 22 applies a braking force to the wheels of the vehicle VH. The transmission device 23 is, for example, a stepped transmission, and transmits the rotational power output from the drive device 20 to the drive wheels by shifting the rotational power at a predetermined transmission ratio. The transmission device 23 may be a continuously variable transmission, but in the following description, the transmission device 23 is referred to as a stepped transmission.

The internal sensor device 30 is sensors which acquire states of the vehicle VH. Specifically, the internal sensor device 30 includes a vehicle speed sensor 31, an accelerator sensor 32, a brake sensor 33, a yaw rate sensor 34, a shift sensor 35, and the like.

The vehicle speed sensor 31 detects the traveling speed of the vehicle VH, that is, the actual vehicle speed V. The accelerator sensor 32 detects an operation amount of an accelerator pedal (not shown), that is, an accelerator opening degree Ac. The brake sensor 33 detects an operation amount of a brake pedal (not shown) by the driver. The yaw rate sensor 34 detects a yaw rate of the vehicle VH. The shift sensor 35 detects the shift position SP (parking P, reverse R, neutral N, driving D) of the transmission device 23. The internal sensor device 30 transmits the condition of the vehicle VH detected by the sensors 31 to 35 to the ECU 10 at a predetermined cycle.

The external sensor device 40 is sensors which acquire a target information of the objects around the vehicle VH. Specifically, the external sensor device 40 includes a radar sensor 41, a camera 42, and the like. As the target information, there are given, for example, a peripheral vehicle, a pedestrian, a traffic light, a white line of a road, a sign, and a falling object, and the like.

The radar sensor 41 detects a target existing around the vehicle VH. The radar sensor 41 includes a millimeter wave radar or Lidar. The millimeter wave radar radiates a radio wave (millimeter wave) in a millimeter wave band, and receives the millimeter wave (reflected wave) reflected by a target existing within a radiation range. The millimeter wave radar acquires a relative distance between the vehicle VH and the target, a relative speed between the vehicle VH and the target, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by a target, to thereby acquire a shape of the target detected in front of the vehicle VH, the relative distance between the vehicle VH and the target, the relative speed between the vehicle VH and the target, and the like.

The camera 42 is, for example, a stereo camera or a monocular camera, and a digital camera including an image pickup element such as a CMOS sensor or a CCD sensor can be used as the camera 42. The camera 42 captures a region around of the vehicle VH, and processes captured image data, to thereby obtain the target information around the vehicle VH. The target information is information indicating a type of the target detected around the vehicle VH, the relative distance between the vehicle VH and the target, the relative speed between the vehicle VH and the target, and the like. The type of the target may be recognized by machine learning such as pattern matching, for example.

The external sensor device 40 repeatedly transmit the acquired object information to the ECU 10 each time a predetermined time elapses. The ECU 10 composes the relative relationship between the vehicle SV and the target acquired by the radar sensor 41 and the relative relationship between the vehicle VH and the target acquired by the camera sensor 42, to thereby determine a relative relationship between the vehicle VH and the target. It is not always required for the external sensor device 40 to include both of the radar sensor 41 and the camera sensor 42, and may include, for example, only the radar sensor 41 or only the camera sensor 42.

The ACC operating unit 50 is a switch group provided in a neighborhood of a driver's seat (for example, a steering wheel, a steering column, or the like), and operated by the driver. The ACC operating unit 50 includes, for example, a start switch 51 for selecting whether to start or end ACC, a setting switch 52 for setting a target vehicle speed and a target inter-vehicle distance (or a target inter-vehicle time) of the ACC, a cancel switch 53 for temporarily canceling the ACC being executed, a resume switch 54 for resuming the ACC, and the like. Note that a part of these switches (for example, the cancel switch 53 and the resume switch 54) may be integrated into one switch.

[Software Configuration]

Figure 2:
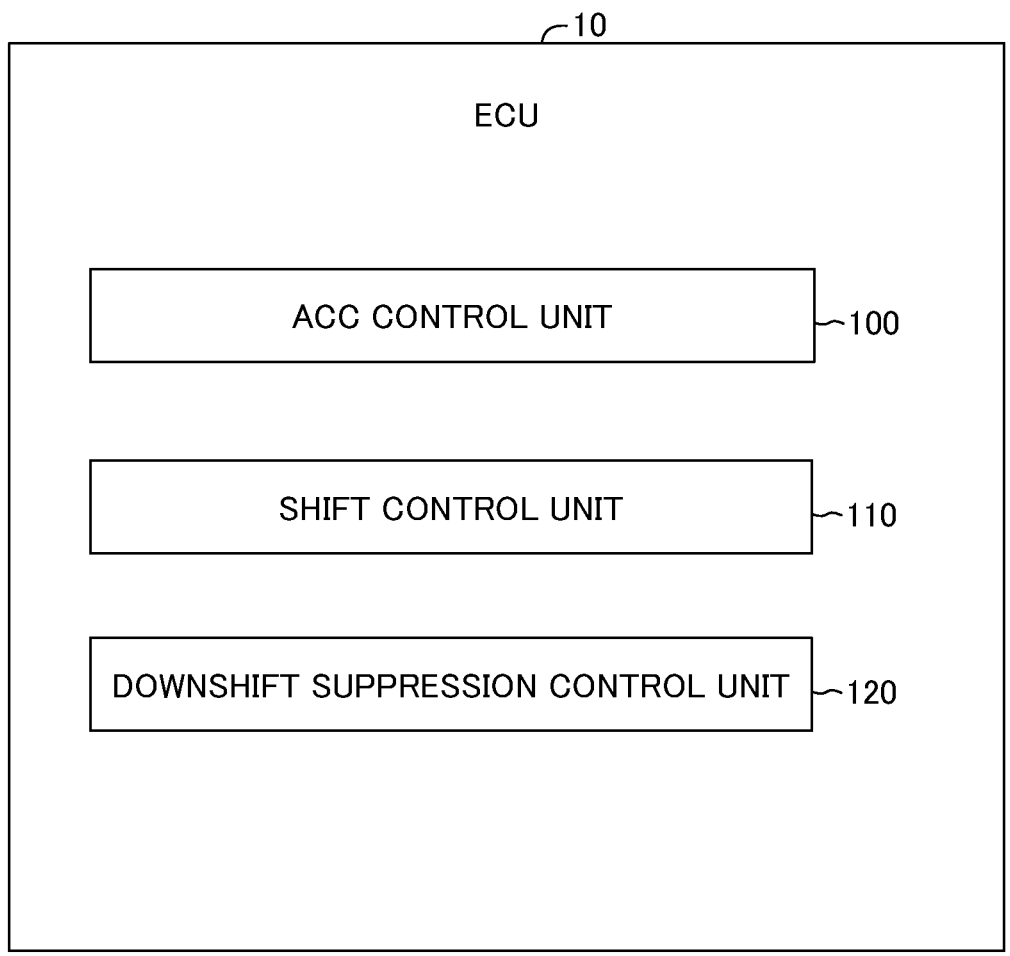
FIG. 2 is a schematic diagram showing a software configuration of a control device to the present embodiment.

FIG. 2 is a schematic diagram showing a software configuration of the ECU 10 to the present embodiment. As shown in FIG. 2, the ECU 10 includes an ACC control unit 100, a shift control unit 110, a downshift suppression control unit 120, and the like as a part of functional elements. Those functional elements 100 to 120 are described as being included in the ECU 10 which is integrated hardware, but any part thereof may be provided to an ECU independent of the ECU 10. Moreover, a part of the functional elements 100 to 120 of the ECU 10 may be provided to an external information processing device of a facility (for example, a managing center) which can communicate to and from the vehicle VH.

The ACC control unit 100 executes the ACC based on the target vehicle speed Vt or the target inter-vehicle distance Dt. The ACC itself is well known. Thus, a brief description is now given of the ACC. The ACC includes two types of control, namely, the constant-speed travel control and the follow-up travel control. The constant-speed travel control is control of causing the vehicle VH to travel at a constant speed in accordance with the target vehicle speed Vt without requiring the accelerator operation of the driver. The follow-up travel control is control of causing the vehicle VH to travel such that the vehicle VH follows a preceding vehicle while maintaining the inter-vehicle distance Dt to the preceding vehicle at the target inter-vehicle distance. The preceding vehicle is a vehicle traveling in front of the vehicle SV.

When the start switch 51 is turned ON, the ACC control unit 100 determines whether or not there is a preceding vehicle to be followed on the basis of the object information transmitted from the external sensor device 40. When determining that the preceding vehicles do not exist, the ACC control unit 100 executes constant speed travel control. In this case, the ACC control unit 100 calculates the target acceleration Gt from the deviation between the actual vehicle speed V and the target vehicle speed Vt, and controls the operation of the drive device 20 and the braking device 22 based on the calculated target acceleration Gt. The actual vehicle speed V may be acquired based on the detection result of the wheel speed sensor 31. On the other hand, when it is determined that the preceding vehicles exist, the ACC control unit 100 executes the follow-up travel control. In this case, the ACC control unit 100 calculates the target acceleration Gt from the deviation between the actual inter-vehicle distance D and the target inter-vehicle distance Dt, and controls the operation of the drive device 20 and the braking device 22 based on the calculated target acceleration Gt. The actual inter-vehicle distance D between own vehicle VH and the preceding vehicle may be acquired based on the detection result of the external sensor device 40.

When the vehicle VH travels on a curved road while ACC is being executed, the ACC control unit 100 executes so-called speed management control for controlling the actual vehicle speed V of the vehicle VH by adjusting the acceleration of the vehicle VH so that the vehicle VH travels stably on the curved road. Whether the vehicle VH is traveling on a curved road may be determined based on division line information such as a white line acquired by the external sensor device 40, or may be determined based on a detection result of the yaw rate sensor 34. In addition, when the vehicle VH includes the map data base in which the map information is stored, whether the vehicle VH is traveling on a curved road may be determined based on the present position of the vehicle VH acquired by GPS or the like and the map information. The acceleration may be adjusted based on the curvature of the curved road on which the vehicle VH travels. The curvature or the like of the curved path may be acquired based on the detection result of the external sensor device 40, or may be acquired based on the map information when the vehicle VH includes the map database. The ACC control unit 100 terminates the speed management control when the vehicle VH finishes traveling on the curved road.

The shift control unit 110 executes shift control for automatically shifting the transmission device 23 up or down based on the traveling condition of the vehicle VH or the like. The shift control is executed, for example, by referring to a shift map (not shown) on the basis of the target driving force Ft of the vehicle VH corresponding to the actual vehicle speed V and the required acceleration. Specifically, when the driver travels the vehicle VH while operating the accelerator pedal, the shift control unit 110 sequentially calculates the target driving force Ft of the vehicle VH on the basis of the present actual vehicle speed V of the vehicle VH and the driver required acceleration Gd corresponding to the accelerator opening degree Ac. Here, the manual driving traveling includes not only a case where the start switch 51 is OFF, but also a case where the driver overrides ACC by an accelerator operation even when the start switch 51 is ON, or a case where ACC is temporarily released by an ON of the cancel switch 53 or a braking operation. The actual vehicle speed V may be acquired based on the detection result of the wheel speed sensor 31, and the accelerator opening degree Ac may be acquired based on the detection result of the accelerator sensor 32. Further, the shift control unit 110 sequentially calculates the target driving force of the vehicle VH on the basis of the actual vehicle speed V of the vehicle VH and the target acceleration Gt of ACC calculated by the ACC control unit 100 during the driving assistance traveling in which the vehicle HV travels by the ACC.

When the target driving force Ft to be sequentially calculated exceeds the shift-up line on the shift map from the "n" speed stage side (where "n" is an integer) to the "n+1" speed stage side, the shift control unit 110 transmits a shift-up command to the transmission device 23. As a result, the transmission device 23 is automatically shifted up from the current shift stage to the one-step high shift stage. On the other hand, when the target driving force Ft exceeds the shift down line on the shift map from the "n+1" speed stage side to the "n" speed stage side, the shift control unit 110 transmits a shift down command to the transmission 23. As a result, the transmission device 23 is automatically shifted down from the current shift stage to the one-step lower shift stage. The downshift line is an example of the driving force threshold of the present disclosure.

[Comparative Example]

Figure 6:
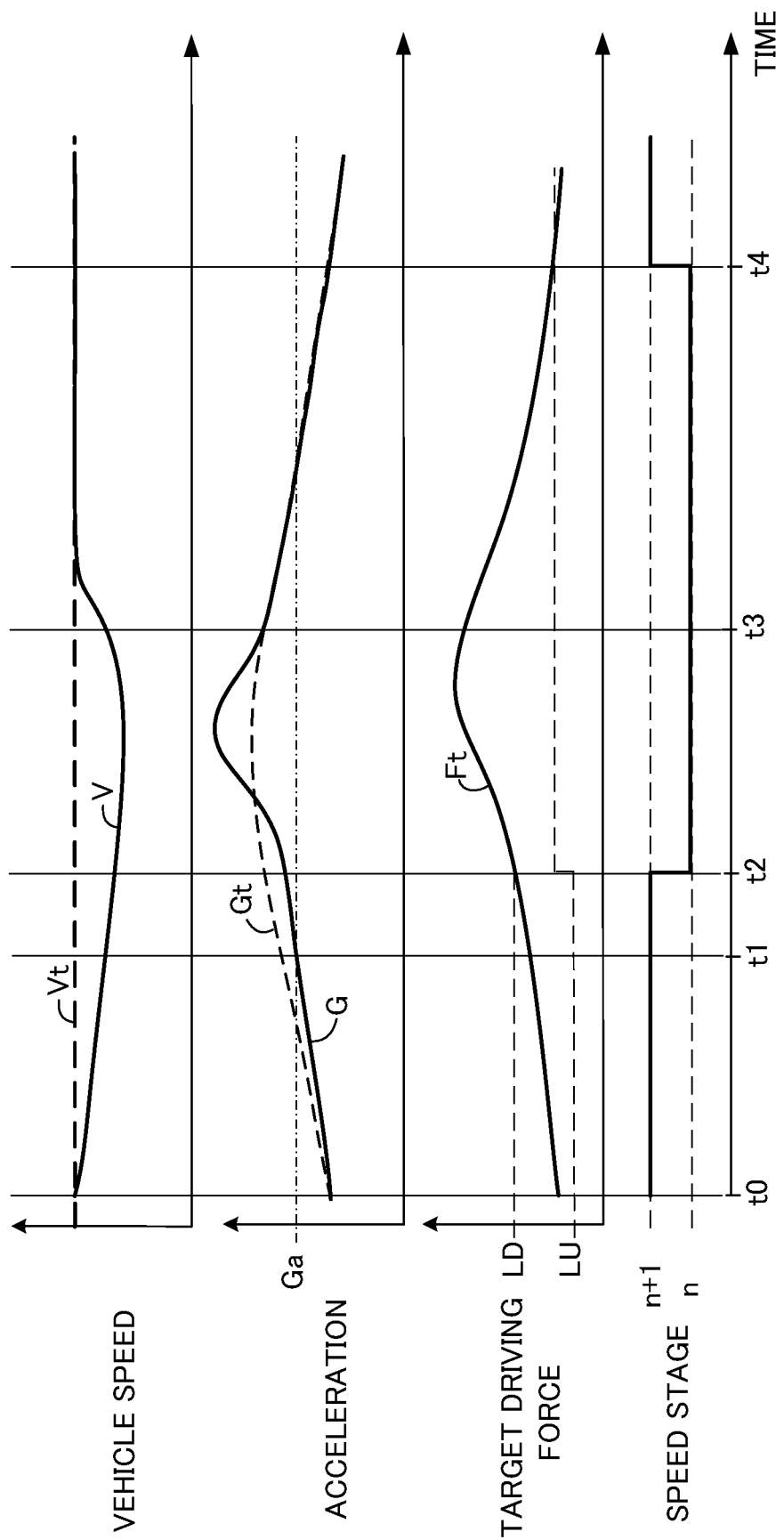
FIG. 6 is a timing chart for explaining a comparative example.

Here, on the basis of FIG. 6, a comparative example will be described in which the downshift suppression control described later is not executed in a situation where the actual vehicle speed V is insufficient with respect to the target vehicle speed Vt during the execution of ACC. Examples of a scene in which the actual vehicle speed V of the vehicle is insufficient with respect to the target vehicle speed Vt of ACC include (1) a case in which the vehicle travels on a road having a relatively large gradient, (2) a case in which the vehicle is re-accelerated after the completion of the speed management control, and (3) a case in which own vehicle is also decelerated with the deceleration of the preceding vehicle during the follow-up of the preceding vehicle, and then own vehicle is re-accelerated by the re-acceleration of the preceding vehicle. FIG. 6 is a timing chart of a comparative example showing the vehicle speed, acceleration, target driving force, and time change of the gear stage in such a scene.

As shown in FIG. 6, it is assumed that the actual vehicle speed V of the vehicle gradually decreases with respect to the target vehicle speed Vt of ACC from the time t0 to the time t1. In this case, the actual acceleration G of the vehicle also gradually decreases with respect to the target acceleration Gt of ACC, and the deviation expands. When the actual acceleration G decreases with respect to the target acceleration Gt, the target driving force Ft of the vehicles gradually increases.

It is assumed that, at time t2, the target driving force Ft reaches the downshift line LD on the shift map, and the downshift line DL exceeds the "n" speed stage side from the "n+1" speed stage side. In this case, even if the actual acceleration G in the time t2 is within the allowable range of the driver (for example, a range in which the driver does not feel the need for further acceleration and is equal to or higher than the allowable acceleration Ga described later), the downshift from the "n+1" speed stage to the "n" speed stage is executed. After the time t2, the deviation of the actual acceleration G with respect to the target acceleration Gt becomes small due to the downshift, and when the target driving force Ft is decreased, the target driving force Ft reaches the upshift line LU on the shift map at the time t4, so that the upshift from the "n" speed stage to the "n+1" speed stage is executed.

In the comparative example shown in FIG. 6, the shift down is executed in the time t2, so that the shift shock (jerk) in which the actual acceleration G varies greatly from the time t2 to the time t3 occurs. That is, even if the actual acceleration G is within the allowable range of the driver, there is a problem that the drivability is deteriorated due to the occurrence of the shift shock due to the unnecessary execution of the downshift. Such a deterioration in drivability may be caused by a sudden increase in the output rotational speed of the drive device even when the transmission device is a continuously variable transmission device. In addition, there is a problem in that the mechanical load of the transmission device 23 increases due to the unnecessary downshift.

[Downshift Suppression Control]

The downshift suppression control unit 120 of the present embodiment suppresses the downshift that such a driver feels unnecessary, thereby preventing deterioration of drivability during ACC. Specifically, the downshift suppression control unit 120 sequentially determines whether the actual acceleration Gt of the vehicle VH is equal to or greater than a predetermined allowable acceleration Ga while the vehicle VH is traveling by ACC. The actual acceleration Gt may be acquired by differentiating the detection value of the wheel speed sensor 31, or may be acquired based on the detection result of the acceleration sensor if the vehicle VH includes the acceleration sensor. The allowable acceleration Ga is an example of acceleration thresholds of the present disclosure.

Figure 3:
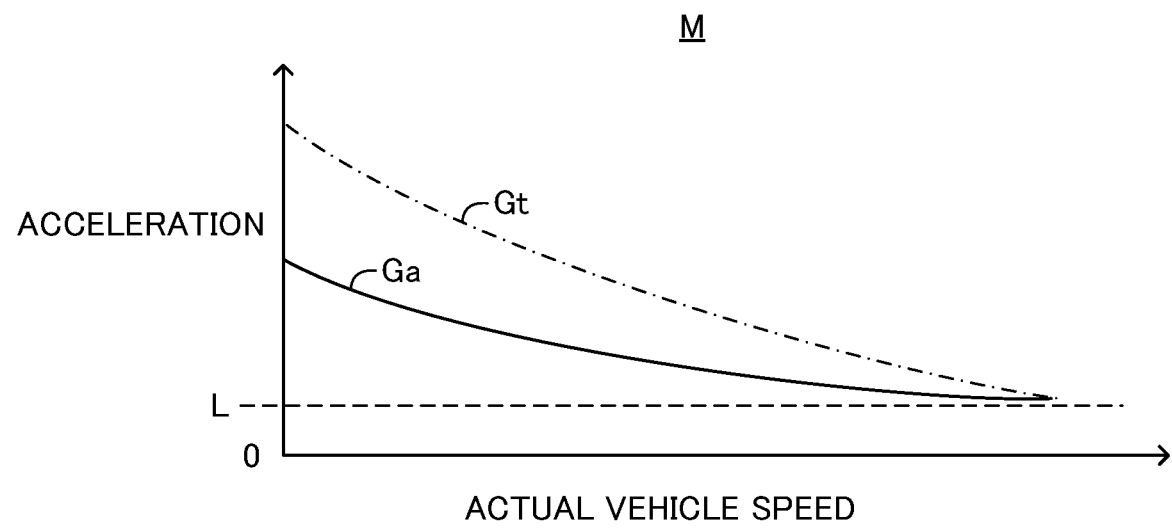
FIG. 3 is a schematic diagram illustrating an allowable acceleration map.

FIG. 3 is a schematic diagram illustrating an allowable acceleration map M that defines a relation between an allowable acceleration Ga and an actual vehicle speed V. The horizontal axis of the allowable acceleration map M represents the actual vehicle speed, and the vertical axis represents the acceleration. The vertical axis and the horizontal axis can be replaced. The allowable acceleration map M is stored in advance in, for example, a ROM of the ECU 10. The allowable acceleration Ga is set to decrease as the actual vehicle speed increases. The allowable acceleration Ga is set at an acceleration smaller than the target acceleration Gt of ACC and larger than a value (see the broken line L) at which the drivers can feel the acceleration of the vehicle VH. Specifically, the allowable acceleration Ga is set with reference to an acceleration that does not require kick-down of the transmission device 23, that is, an acceleration that can hold the accelerator operation amount and wait for an increase in the actual vehicle speed V during manual driving in which the driver travels the vehicle VH while performing the accelerator operation. The allowable acceleration Ga may be set in advance by simulation or the like, or may be set by acquiring and reflecting acceleration data used by many drivers from big data or the like.

When the vehicle VH travels by ACC, the downshift suppression control unit 120 sequentially acquires the allowable acceleration Ga corresponding to the actual vehicle speed V by referring to the allowable acceleration map M based on the actual vehicle speed V at that time. When the allowable acceleration Ga is acquired, the downshift suppression control unit 120 determines whether the actual acceleration G of the vehicle VH at that time is equal to or greater than the allowable acceleration Ga. When the actual acceleration G is equal to or higher than the allowable acceleration Ga, the downshift suppression control unit 120 suppresses the downshift by the shift control unit 110, that is, prohibits the downshift even if the downshift condition in which the target driving force Ft exceeds the downshift line DL on the shift map is satisfied.

This suppresses unnecessary shift that is not desired by the drivers during execution of ACC. As a result, it is possible to prevent the occurrence of a shift shock caused by the down shift, and to improve the drivability. In addition, it is conceivable to adjust the target acceleration of ACC in accordance with the slope information or the like of the road. However, in this case, it is necessary to sequentially calculate the target acceleration of an appropriate ACC in which the transmission device 23 does not shift down, and not only the number of adaptation steps increases, but also a device for acquiring the slope information is required, resulting in an increase in cost. On the other hand, according to the present embodiment in which the downshift is suppressed based on the allowable acceleration Ga, the number of adaptation steps can be greatly reduced, and further, since a device for acquiring gradient information is not required, the cost can be effectively suppressed. In addition, by suppressing unnecessary downshift execute, it is also possible to effectively reduce the mechanical load of the transmission device 23.

Figure 4:
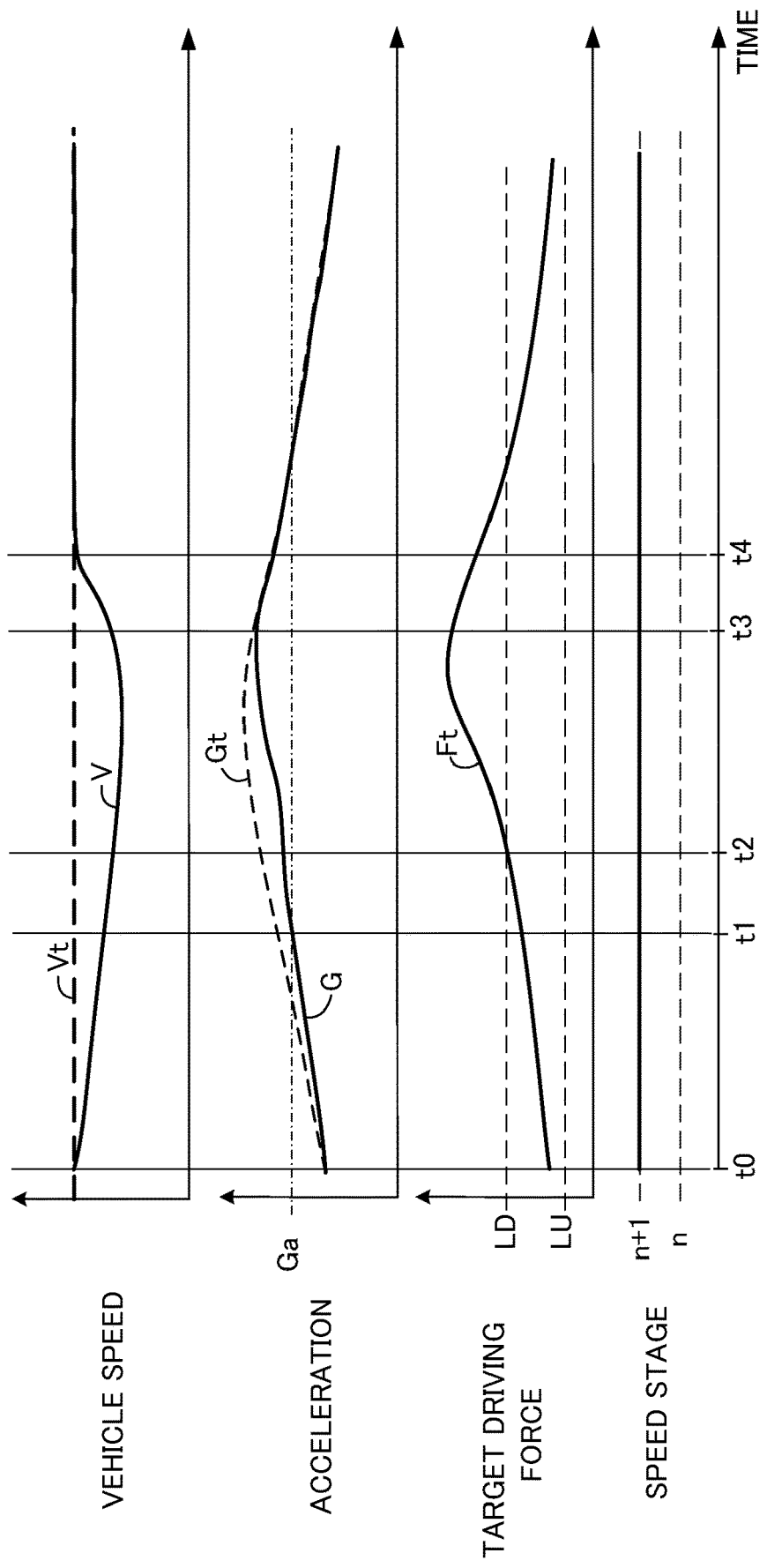
FIG. 4 is a timing chart for explaining the downshift suppression control.

FIG. 4 is a timing chart illustrating the downshift suppression control according to the present embodiment. FIG. 4 is a timing chart showing temporal changes in the vehicle speed, the acceleration, the target driving force, and the gear stage in the above-described (1) to (3) scenes in which the actual vehicle speed V is insufficient with respect to the target vehicle speed Vt during ACC as in the comparative example of FIG. 6.

As shown in FIG. 4, it is assumed that the actual vehicle speed V of the vehicle VH gradually decreases with respect to the target vehicle speed Vt of ACC from the time t0 to the time t1. In this case, the actual acceleration G of the vehicle VH also gradually decreases with respect to the target acceleration Gt of ACC. When the actual acceleration G decreases with respect to the target acceleration Gt, the target driving force Ft of the vehicle VH gradually increases.

It is assumed that, at time t1, the actual acceleration G becomes equal to or higher than the allowable acceleration Ga, and at time t2, the target driving force Ft reaches the downshift line LD on the shift map. In the time t2, since the actual acceleration G exceeds the allowable acceleration Ga, the driver does not desire to downshift the transmission device 23, and it is considered that the actual vehicle speed V and the actual acceleration G are desired to increase at the present transmission stage. In this case, the downshift suppression control unit 120 suppresses the execution of the downshift by the shift control unit 110, that is, prohibits the downshift. As a result, unnecessary downshift execute is suppressed, and the occurrence of shift shock due to downshift can be effectively prevented.

When the actual acceleration G coincides with the target acceleration Gt at the time t3, the deviation between the actual vehicle speed V and the target vehicle speed Vt gradually decreases. When the actual vehicle speed V coincides with the target vehicle speed Vt at the time t4, after that, the shift-up condition in which the target driving force Ft exceeds the shift-up line LU is satisfied, or when the target driving force Ft exceeds the shift-down line LD, the transmission device 23 is maintained at the present shift stage until the shift-down condition in which the actual acceleration G is decreased from the allowable acceleration Ga is satisfied.

Figure 5:
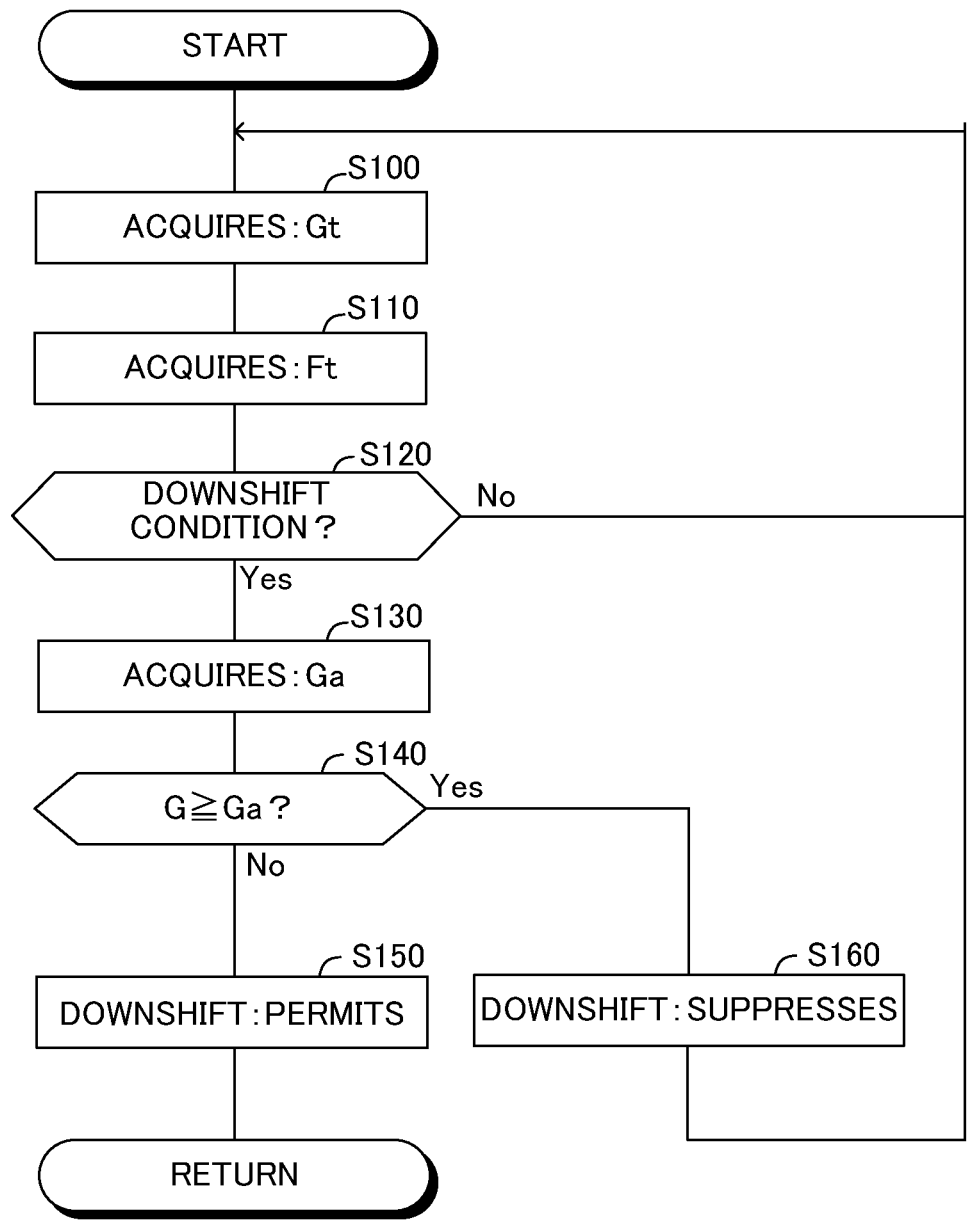
FIG. 5 is a flowchart for explaining a routine of the downshift suppression control.

FIG. 5 is a flowchart illustrating a routine of processing executed by the downshift suppression control unit 120. This routine is started, for example, when the vehicle VH travels by executing ACC by the ACC control unit 100.

In step S100, the downshift suppression control unit 120 acquires the target acceleration Gt calculated by the ACC control unit 100. The target acceleration Gt is calculated based on a deviation between the actual vehicle speed V and the target vehicle speed Vt when the ACC control unit 100 executes the constant speed travel control, and is calculated based on a deviation between the actual inter-vehicle distance D and the target inter-vehicle distance Dt when the ACC control unit 100 executes the following travel control.

In step S110, the downshift suppression control unit 120 acquires the target driving force Ft calculated by the shift control unit 110. The target driving force Ft is calculated based on the actual vehicle speed V and the target acceleration Gt of ACC. Note that the processes of the step S100 and the step S110 may be performed simultaneously.

In step S120, the downshift suppression control unit 120 determines whether or not a downshift condition in which the target driving force Ft acquired in step S110 exceeds the downshift line on the shift map is satisfied. When the target driving force Ft does not exceed the downshift line on the shift map (No), that is, when the downshift condition is not satisfied, the downshift suppression control unit 120 returns the process to step S100. On the other hand, when the target driving force Ft exceeds the downshift line on the shift map (Yes), that is, when the downshift condition is satisfied, the downshift suppression control unit 120 advances the process to step S130.

In step S130, the downshift suppression control unit 120 acquires the allowable acceleration Ga corresponding to the actual vehicle speed V by referring to the allowable acceleration map M based on the actual vehicle speed V. Next, in step S140, the downshift suppression control unit 120 determines whether or not the actual acceleration G is equal to or greater than the allowable acceleration Ga. When the actual acceleration G is not equal to or larger than the allowable acceleration Ga (No), that is, when the actual acceleration G is smaller than the allowable acceleration Ga, the downshift suppression control unit 120 advances the process to step S150. In step S150, the downshift suppression control unit 120 permits the shift control unit 110 to perform downshift, and returns this routine. On the other hand, when the actual acceleration G is equal to or greater than the allowable acceleration Ga (Yes), the downshift suppression control unit 120 advances the process to step S160, and suppresses the execution of the downshift by the shift control unit 110, that is, prohibits the execution of the downshift. When the downshift suppression control unit 120 prohibits the downshift from being executed at step S160, then returns this routine.

According to the vehicle control device of the present embodiment described in detail above, the ECU 10 includes the ACC control unit 100 that executes ACC, the shift control unit 110 that upshifts or downshifts the transmission device 23 based on the target driving force Ft of the vehicle VH, and the downshift suppression control unit 120 that suppresses the execution of the downshift by the shift control unit 110 during the execution of ACC. The downshift suppression control unit 120 suppresses the execution of the downshift by the shift control unit 110 when the relation between the actual acceleration G of the vehicle ACC and a predetermined acceleration threshold that differs from the target acceleration Gt of ACC satisfies the specified condition even when the downshift condition in which the target driving force Ft exceeds the downshift line LD is satisfied during the execution of Gt, specifically, when the actual acceleration G is equal to or greater than the allowable acceleration Ga. This prohibits the unnecessary downshifts during the execution of ACC, thereby preventing the shift-down shocks from occurring, and can reliably improve the drivability.

In the above, the vehicle control device according to the at least one embodiment have been described, but the present disclosure is not limited to the above-mentioned at least one embodiment, and various modifications are possible within the range not departing from the object of the present disclosure.

For example, in the above embodiment, the vehicle VH has been described as a vehicle capable of executing ACC (constant speed travel control and tracking travel control), but may be a vehicle capable of executing only cruise control (constant speed travel control). Further, although the allowable acceleration Ga has been described as a variable value corresponding to the actual vehicle speed V, it may be a fixed value or may be a variable value corresponding to a parameter other than the actual vehicle speed V. As a parameter other than the actual vehicle speed V, a target inter-vehicle distance Dt of ACC is exemplified. When the allowable acceleration Ga is set to a variable value corresponding to the target inter-vehicle distance Dt, the allowable acceleration Ga may be made smaller as the set target inter-vehicle distance Dt is longer. Further, the allowable acceleration Ga may be a variable value corresponding to an external environment (for example, an outside air temperature, rainfall, road surface conditions, a time-zone, and the like) surrounding the vehicle VH. Further, the present disclosure can also be applied to an autonomous vehicle that automatically performs some or all of the driving operations.

What is claimed is:

1. A vehicle control device which is applied to a vehicle having a transmission device in a power transmission path for transmitting power from a drive device to a drive wheel, the vehicle control device comprising:
   a travel control unit configured to set a target acceleration of the vehicle based on either a predetermined target vehicle speed and an actual vehicle speed, or a predetermined target inter-vehicle distance and an actual inter-vehicle distance, and execute a travel control for automatically controlling travel of the vehicle by operating the drive device based on the target acceleration;
   a shift control unit configured to set a target driving force of the vehicle based on at least an actual vehicle speed, and execute a shift control for operating the transmission device based on the target driving force; and
   a downshift suppression control unit configured to acquire an actual acceleration during execution of the travel control by the travel control unit and suppress execution of downshift of the transmission device by the shift control unit based on a predetermined acceleration threshold value different from the target acceleration and the actual acceleration.

2. The vehicle control device according to claim 1,
   wherein the shift control unit is configured to shift down the transmission device when the target driving force exceeds a predetermined driving force threshold value, and
   wherein the downshift suppression control unit is configured to suppress execution of the downshift by the shift control unit when the actual acceleration is equal to or larger than the acceleration threshold value, even if the target driving force exceeds the driving force threshold during execution of the travel control by the travel control unit.

3. The vehicle control device according to claim 2, wherein the acceleration threshold value is set at an acceleration smaller than the target acceleration and larger than a value at which an occupant of the vehicle can feel acceleration of the vehicle.

4. The vehicle control device according to claim 2, wherein the acceleration threshold value is set so as to decrease as the actual vehicle speed increases.

5. The vehicle control device according to claim 2, wherein the acceleration threshold value is set based on an allowable acceleration at which a driver of the vehicle can feel that acceleration of the vehicle due to downshift of the transmission is unnecessary.

6. The vehicle control device according to claim 1,
wherein the acceleration threshold value is set at an acceleration smaller than the target acceleration and larger than a value at which an occupant of the vehicle can feel acceleration of the vehicle.

7. The vehicle control device according to claim 1,
wherein the acceleration threshold value is set so as to decrease as the actual vehicle speed increases.

8. The vehicle control device according to claim 1,
wherein the acceleration threshold value is set based on an allowable acceleration at which a driver of the vehicle can feel that acceleration of the vehicle due to downshift of the transmission is unnecessary.

* * * * *